(12) United States Patent
Olsen

(10) Patent No.: US 8,632,306 B2
(45) Date of Patent: Jan. 21, 2014

(54) WIND TURBINE BLADE WITH LIGHTNING RECEPTOR AND METHOD FOR PROTECTING THE SURFACE OF A WIND TURBINE BLADE

(75) Inventor: Kaj Olsen, Riiskov (DK)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 13/470,405

(22) Filed: May 14, 2012

(65) Prior Publication Data

US 2012/0243997 A1 Sep. 27, 2012

Related U.S. Application Data

(63) Continuation of application No. 12/489,699, filed on Jun. 23, 2009, now Pat. No. 8,430,631.

(30) Foreign Application Priority Data

Jul. 2, 2008 (EP) ..................................... 08011962

(51) Int. Cl.
F03D 1/02 (2006.01)
(52) U.S. Cl.
USPC .......................................... 416/1; 416/229 R
(58) Field of Classification Search
USPC .......................................... 416/1, 229 R, 230
See application file for complete search history.

(56) References Cited

U.S. PATENT DOCUMENTS

| | | | | |
|---|---|---|---|---|
| 3,347,978 A | * | 10/1967 | Simon et al. | 174/84 R |
| 3,416,027 A | * | 12/1968 | Amason et al. | 315/36 |
| 4,628,402 A | * | 12/1986 | Covey | 361/218 |
| 4,796,153 A | * | 1/1989 | Amason et al. | 361/218 |
| 6,320,118 B1 | * | 11/2001 | Pridham et al. | 174/2 |
| 6,457,943 B1 | * | 10/2002 | Olsen et al. | 416/230 |
| 6,979,179 B2 | * | 12/2005 | Møller Larsen | 416/223 R |
| 7,040,864 B2 | * | 5/2006 | Johansen et al. | 416/146 R |
| 7,651,320 B2 | * | 1/2010 | Hansen | 416/1 |
| 7,869,181 B2 | * | 1/2011 | Le | 361/218 |
| 7,883,321 B2 | * | 2/2011 | Bertelsen | 416/146 R |
| 7,938,625 B2 | * | 5/2011 | Dahl et al. | 416/146 R |
| 8,133,031 B2 | * | 3/2012 | Arinaga et al. | 416/229 R |
| 8,137,074 B2 | * | 3/2012 | Mendez Hernandez et al. | 416/230 |
| 8,182,227 B2 | * | 5/2012 | Jacobsen et al. | 416/146 R |
| 8,191,255 B2 | * | 6/2012 | Kristensen et al. | 29/889.71 |

(Continued)

FOREIGN PATENT DOCUMENTS

| | | | |
|---|---|---|---|
| JP | 2005302399 A | | 10/2005 |
| JP | 2007100658 A | * | 4/2007 |
| JP | 2008115783 A | * | 5/2008 |
| JP | 2010059813 A | * | 3/2010 |

OTHER PUBLICATIONS

Machine translation for JP2007100658A.*

*Primary Examiner* — Edward Look
*Assistant Examiner* — Christopher R Legendre

(57) ABSTRACT

A wind turbine blade has at least one lightning receptor, wherein at least part of a surface of the wind turbine blade close to the lightning receptor is covered by a protective layer having electrical and thermal insulating material. Moreover, a method for protecting the surface of a wind turbine blade close to a lightning protector against temperature increase resulting from lightning impact is disclosed. At least part of the surface of the wind turbine blade is covered with a protective layer having electrical and thermal insulating material.

8 Claims, 3 Drawing Sheets

(56) References Cited

U.S. PATENT DOCUMENTS

| | | | |
|---|---|---|---|
| 2004/0028528 A1* | 2/2004 | Flemming | 416/146 R |
| 2005/0186081 A1* | 8/2005 | Mohamed | 416/226 |
| 2006/0280613 A1* | 12/2006 | Hansen | 416/230 |
| 2007/0081900 A1* | 4/2007 | Nies | 416/224 |
| 2009/0053062 A1* | 2/2009 | Arinaga et al. | 416/146 R |
| 2009/0139739 A1 | 6/2009 | Hansen | |
| 2009/0246025 A1* | 10/2009 | Lewke et al. | 416/146 R |
| 2009/0257881 A1* | 10/2009 | Ostergaard Kristensen et al. | 416/229 R |
| 2009/0257882 A1* | 10/2009 | Olsen | 416/241 B |
| 2011/0142644 A1* | 6/2011 | Fritz et al. | 416/146 R |
| 2011/0142671 A1* | 6/2011 | Fritz et al. | 416/230 |
| 2011/0182731 A1* | 7/2011 | Naka et al. | 416/1 |
| 2012/0243997 A1* | 9/2012 | Olsen | 416/146 R |
| 2013/0149153 A1* | 6/2013 | Fujioka et al. | 416/146 R |

* cited by examiner

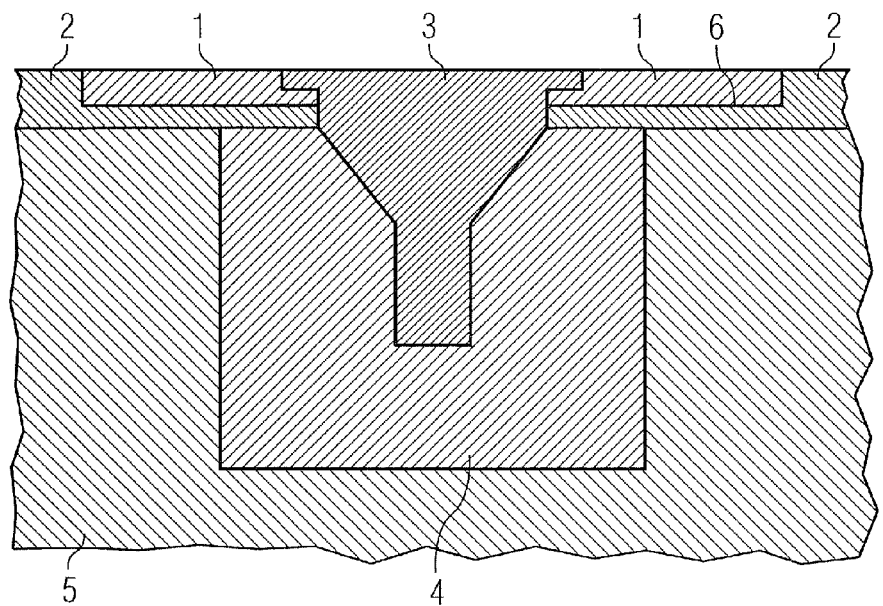
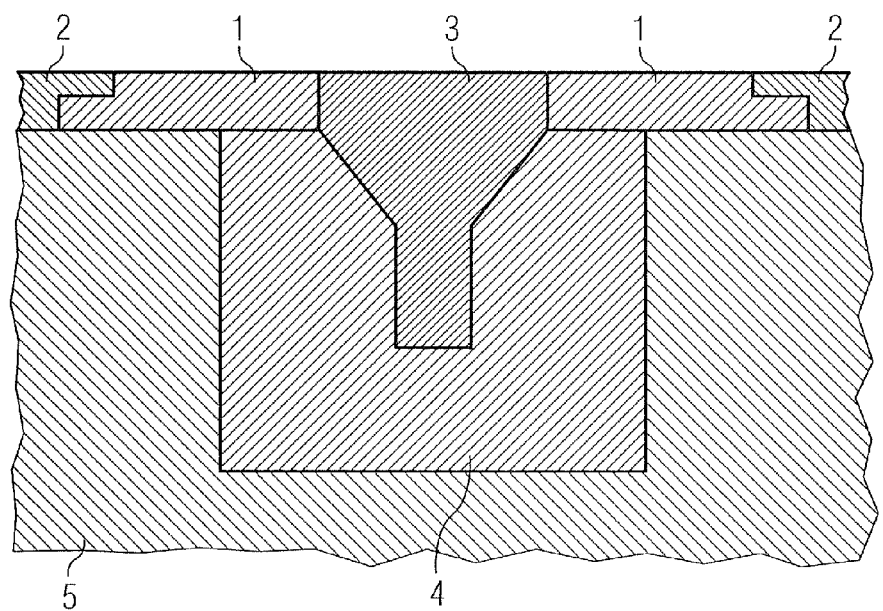

WIND TURBINE BLADE WITH LIGHTNING RECEPTOR AND METHOD FOR PROTECTING THE SURFACE OF A WIND TURBINE BLADE

CROSS REFERENCE TO RELATED APPLICATIONS

This application is a continuing application of U.S. non provisional application Ser. No. 12/489,699 filed Jun. 23, 2009 now U.S. Pat. No. 8,430,631, which claims priority of European patent application no. 08011962.1 EP filed Jul. 2, 2008. All of the applications are incorporated by reference herein in their entirety.

FIELD OF INVENTION

The present invention relates to a wind turbine blade comprising at least one lightning receptor. It further relates to a method for protecting the surface of wind turbine blade.

BACKGROUND OF INVENTION

Wind turbines are normally placed far away from other tall structures and are therefore exposed to impact from lightning. Wind turbine blades are typically manufactured of a glass fibre laminate which can be seriously damaged by lightning impact. To prevent such damage the blades are provided with metallic lightning receptors which are mounted in the blade in such a way that the surface of a receptor is essentially in the plane of the outer skin of the blade. These receptors are then connected to ground through heavy gauge conductors.

The temperature of the air surrounding a lightning bolt can reach several thousand ° C. When lightning strikes a lightning receptor some of the energy of the air is transferred to the surface of the blade next to the receptor. This can lead to scorching of the paint and in some cases also of the underlying laminate. Thus, the integrity of the surface of the blade is compromised and the laminate is exposed to the atmosphere. The humidity can then penetrate the damaged parts of the laminate and lead to either a softening of the laminate or to spalling. The conventional way of reacting to the problem is to register the lightning impacts and then repair the damage that may have occurred.

SUMMARY OF INVENTION

Therefore, it is a first objective of the present invention to provide an advantageous wind turbine blade. It is a second objective of the present invention to provide an advantageous method for protecting the surface of a wind turbine blade. The first objective is solved by a wind turbine blade comprising at least one lightning receptor as claimed in the independent claims. The second objective is solved by a method for protecting the surface of a wind turbine blade close to a lightning protector against temperature increase resulting from lightning impact as claimed in the independent method claim. The depending claims define further developments of the invention.

The inventive wind turbine blade comprises at least one lightning receptor. At least part of the surface of the wind turbine blade close to the lightning receptor is covered by a protective layer comprising electrical and thermal insulating material. The protective layer protects the surface of the wind turbine blade close to the lightning receptor against the temperature increase resulting from lightning impact. Advantageously this can be achieved by covering the surface by a layer of a material which combines high resistance to thermal damage with good electrical insulation properties.

Preferably the protective layer can have a resistance to thermal damage up to a temperature of at least 200° C. The protective layer may especially comprise a ceramic or a polymer. For example, the protective layer can comprise polytetrafluorethylene (PTFE or Teflon). PTFE is a polymer which has a low thermal conductivity and which is therefore suited for a thermal protection. It has excellent dielectric properties, even at elevated temperatures, especially up to 300° C. Moreover, it has a good resistance to arcing. This reduces the risk that lighting strikes through the laminate surface instead of impacting the receptor.

Lightning receptors are typically mounted in pairs, one at either of the flat faces of the blade. The part of a wind turbine blade which is most likely to be struck by lightning is the region close to the tip of the blade. Therefore, it is advantageous to cover the area around the two lightning receptors closest to the tip. But in principle the area around a receptor placed anywhere at the surface of the blade can be covered in a similar way.

Scorching of the surface of a wind turbine blade has been observed to be more pronounced in the direction of the trailing edge, as seen from the receptor. Therefore, the wind turbine blade may comprise a trailing edge and the protective layer may extend further in the direction of the trailing edge than in other directions. Preferably, the protective layer may cover the surface of the blade within at least 10 cm of the receptor.

For example, the protective layer may comprise at least one patch with an opening for the receptor. These patches need not to have any particular shape, but should cover the surface of the blade within at least 10 cm of the receptor, and may possibly extend further in the direction of the trailing edge.

Furthermore, the protective layer can comprise a band which is wound around the entire circumference of the blade. This band can be of PTFE. It can further be glued onto the surface of the blade. Openings for the receptors can be provided.

The wind turbine blade may also comprise a tip and the protective layer may comprise a cap that fits over the entire tip. Openings for the receptors can be provided. Furthermore, the protective layer may be glued onto the surface of the blade. Generally, the protective layer may comprise at least one opening for the receptor. Furthermore, the wind turbine may comprise glass fibre laminate and the protective layer can be an integrated part of the glass fibre laminate.

In the inventive method for protecting the surface of a wind turbine blade close to a lightning protector against temperature increase resulting from lightning impact at least part of the surface of the wind turbine blade is covered with a protective layer comprising electrical and thermal insulating material. Such a layer can protect the surface and the underlying laminate from scorching. Scorching can expose the structural components of the blade to the elements and can lead to gradual wear of the blade.

The protective layer can especially be glued onto the surface of the wind turbine blade. Alternatively, the protective layer may be integrated in a laminated structure of the wind turbine blade. Furthermore, the protective layer can be mounted in a cut-out part of the surface of the wind turbine blade. The protective layer can be retained by a receptor. Another possibility is winding a band of electrical and thermal insulating material around the entire circumference of the wind turbine blade.

The protective layer may especially have a resistance to thermal damage up to a temperature of at least 200° C. Moreover, the protective layer may comprise a ceramic or a polymer, for example polytetrafluorethylene.

The wind turbine blade may comprise a trailing edge and the protective layer may extend further in the direction of the trailing edge than in other directions. Preferably, the protective layer may cover the surface of the blade within at least 10 cm of the receptor. Advantageously, the protective layer may have a resistance to thermal damage up to a temperature of at least 200° C.

Covering the surface of a wind turbine blade by a layer of a heat protecting material effectively protects the surface of the underlying laminate from scorching which can expose the structural components of the blade to the elements and lead to gradual wear of the blade.

BRIEF DESCRIPTION OF THE DRAWINGS

Further features, properties and advantages of the present invention will become clear from the following description of embodiments in conjunction with the accompanying drawings. The described features are advantageous alone and in combination with each other.

FIG. 2 schematically shows part of a wind turbine blade in a sectional view.

FIG. 3 schematically shows part of another variant of a wind turbine blade in a sectional view.

DETAILED DESCRIPTION OF INVENTION

Figure 1:
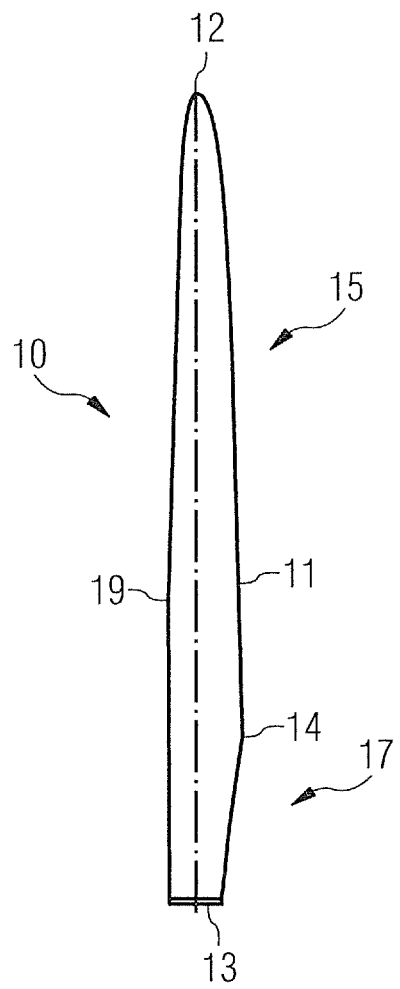
FIG. 1 schematically shows a wind turbine rotor blade in a plan view.

A first embodiment of the present invention will now be described with reference to FIGS. 1 and 2. FIG. 1 schematically shows a wind turbine rotor blade in a plan view on the plane defined by the blade's span and the blade's chord. FIG. 1 shows a wind turbine blade 10 as it is usually used in a three-blade rotor. However, the present invention shall not be limited to blades for three-blade rotors. In fact, it may as well be implemented in other rotors, e.g. one-blade rotors or two-blade rotors.

The rotor blade 10 shown in FIG. 1 comprises a root portion 13 with a cylindrical profile, a tip 12, a leading edge 19 and a trailing edge 11. The tip 12 forms the outermost part of the blade 10. The cylindrical profile of the root portion 13 serves to fix the blade 10 to a bearing of a rotor hub. The rotor blade 10 further comprises a so-called shoulder 14 which is defined as the location of its maximum profile depth, i.e. the maximum chord length of the blade. Between the shoulder 14 and the tip 12 an airfoil portion 15 extends which has an aerodynamically shaped profile. Between the shoulder 14 and the cylindrical root portion 13, a transition portion 17 extends in which a transition takes place from the aerodynamic profile of the airfoil portion 15 to the cylindrical profile of the root portion 13.

FIG. 2 schematically shows part of a wind turbine blade in a sectional view. The wind turbine blade comprises core material 5 which forms the inner part of the wind turbine blade. It further comprises a laminate structure 2 which forms the outer part of the wind turbine blade. A protective layer 1, which is formed as a disc of either PTFE or ceramic, is mounted in a cut-out part 6 of the surface of the laminate 2. The protective layer 1 is retained by the receptor 3. The receptor 3 is bolted onto a metallic support 4. The metallic support 4 is surrounded by the glass fibre laminate 2 and various core materials 5 of the blade. In this embodiment the support 4 is integrated in the laminated structure of the blade, whereas the disc of protective layer 1 and the receptor 3 are mounted after the moulding of the blade has been completed. The conductor leading the current to ground is not shown in FIG. 2.

The disc of protective layer 1 need not to have any particular shape, but should cover the surface of the blade within at least 10 cm of the receptor 3, and possibly extend further in the direction of the trailing edge 11.

A second embodiment of the present invention will now be described with reference to FIGS. 1 and 3. Elements corresponding to elements of the first embodiment will be designated with the same reference numerals and will not be described again in detail.

FIG. 3 schematically shows part of a wind turbine blade in a sectional view. In FIG. 3 the disc of protective layer 1 is included in the lay-up during manufacture of the blade. The disc of protective layer 1 thus becomes an integrated part of the glass fibre laminate 2 together with the core materials 5 and the support 4. The receptor 3 is mounted after the moulding of the blade has been completed. Again, the conductor leading the current to ground is not shown in FIG. 3. The disc of protective layer 1 need not to have any particular shape, but should cover the surface of the blade within at least 10 cm of the receptor and possibly extend further in the direction of the trailing edge 11.

In both embodiments the protective layer 1 protects the surface of the blade and the underlying laminate against the temperature increase resulting from lightning impact.

Figure 4:
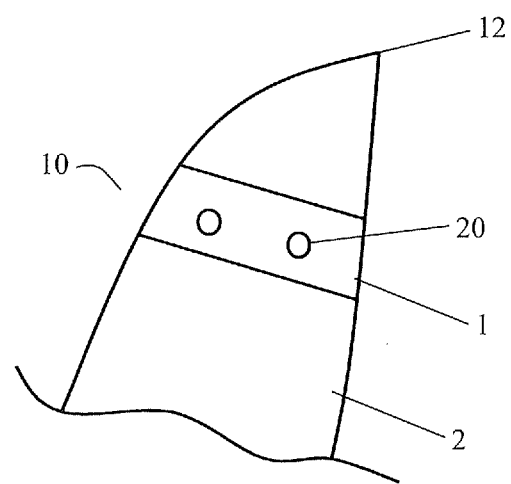
FIG. 4 schematically shows part of another variant of a wind turbine blade in a plan view.

FIG. 4 shows another embodiment of a wind turbine blade 10 with a laminated structure 2 in a plan view. The protective layer 1 comprises a band which is wound around the entire circumference of the blade 10. This band may be of PTFE. The band may further be glued onto the surface of the blade 10. Openings 20 for the receptors may be provided.

The invention claimed is:

1. A method for protecting the surface of a wind turbine blade adjacent to a lightning receptor against temperature increase resulting from lightning impact, comprising:
    covering a part of a surface of the wind turbine blade with a protective layer comprising electrical and thermal insulating material, wherein the protective layer comprises a band which is wound around an entire circumference of the blade and surrounds the lightning receptor.

2. The method as claimed in claim 1, further comprising: gluing the band onto the surface of the wind turbine blade.

3. A wind turbine blade, comprising:
    a lightning receptor,
    wherein a part of a surface of the wind turbine blade adjacent to the lightning receptor is covered by a protective layer having electrical and thermal insulating material,
    wherein the protective layer comprises a band which is wound around an entire circumference of the blade and surrounds the lightning receptor.

4. The wind turbine blade as claimed in claim 3, wherein the protective layer has a resistance to thermal damage up to a temperature of at least 200° C.

5. The wind turbine blade as claimed in claim 3, wherein the band comprises polytetrafluorethylene (PTFE).

6. The wind turbine blade as claimed in claim 3, wherein the band covers the surface of the blade within at least 10 cm of the receptor.

7. The wind turbine blade as claimed in claim 3, wherein the band comprises at least one patch with an opening for the receptor.

8. The wind turbine blade as claimed in claim 3, wherein the band comprises at least one opening for the receptor.

* * * * *